US009886669B2

(12) United States Patent
Amershi et al.

(10) Patent No.: US 9,886,669 B2
(45) Date of Patent: Feb. 6, 2018

(54) INTERACTIVE VISUALIZATION OF MACHINE-LEARNING PERFORMANCE

(71) Applicant: MICROSOFT CORPORATION, Redmond, WA (US)

(72) Inventors: Saleema A. Amershi, Seattle, WA (US); Steven M. Drucker, Bellevue, WA (US); Bongshin Lee, Issaquah, WA (US); Patrice Yvon Rene Simard, Bellevue, WA (US); Aparna Lakshmiratan, Kirkland, WA (US); Carlos Garcia Jurado Suarez, Redmond, WA (US); Denis X. Charles, Redmond, WA (US); David G. Grangier, Kirkland, WA (US); David Maxwell Chickering, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 784 days.

(21) Appl. No.: 14/191,033

(22) Filed: Feb. 26, 2014

(65) Prior Publication Data

US 2015/0242761 A1 Aug. 27, 2015

(51) Int. Cl.
*G06N 99/00* (2010.01)
*G06F 3/048* (2013.01)
(Continued)

(52) U.S. Cl.
CPC ........... *G06N 99/005* (2013.01); *G06F 3/048* (2013.01); *G06K 9/00536* (2013.01); *G06K 9/6253* (2013.01)

(58) Field of Classification Search
CPC .. G06N 99/005; G06F 3/048; G06K 9/00536; G06K 9/6253
See application file for complete search history.

(56) References Cited

U.S. PATENT DOCUMENTS 6,526,168 B1   2/2003 Ornes et al.
8,306,940 B2  11/2012 Lee et al.
(Continued)

OTHER PUBLICATIONS

Bosch, et al.,"ScatterBlogs2: Real-Time Monitoring of Microblog Messages through User-Guided Filtering," In IEEE Transactions on Visualization and Computer Graphics, vol. 19, Published Oct. 13, 2013, http://www.vis.uni-stuttgart.de/uploads/tx_vispublications/vast2013-bosch-preprint.pdf, 10 pages.
(Continued)

*Primary Examiner* — Justin R Blaufeld
(74) *Attorney, Agent, or Firm* — Shook, Hardy & Bacon L.L.P.

(57) ABSTRACT

Methods, computer systems, computer-storage media, and graphical user interfaces are provided for visualizing a performance of a machine-learned model. An interactive graphical user interface includes an item representation display area that displays a plurality of item representations corresponding to a plurality of items processed by the machine-learned model. The plurality of item representations are arranged according to scores assigned to the plurality of items by the machine-learned model. Further, each of the plurality of item representations is visually configured to represent a label assigned to a corresponding item.

20 Claims, 8 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 8,595,153 B2 | 11/2013 | Drucker et al. | |
| 9,430,460 B2* | 8/2016 | Simard | G06F 17/2785 |
| 2002/0143472 A1* | 10/2002 | Mutter | G06F 19/20 702/20 |
| 2004/0225653 A1* | 11/2004 | Nelken | G06F 17/30286 |
| 2005/0276485 A1* | 12/2005 | Mori | G06K 9/6253 382/228 |
| 2009/0091443 A1* | 4/2009 | Chen | G06K 9/00536 340/540 |
| 2010/0241596 A1* | 9/2010 | Lee | G06N 99/005 706/11 |
| 2012/0158623 A1* | 6/2012 | Bilenko | G06N 99/005 706/12 |
| 2012/0284212 A1* | 11/2012 | Lin | G06N 99/005 706/12 |
| 2013/0031130 A1 | 1/2013 | Hahm | |
| 2014/0173444 A1* | 6/2014 | Wu | G06F 3/04842 715/734 |

OTHER PUBLICATIONS

Bergner, et al., "ParaGlide: Interactive Parameter Space Partitioning for Computer Simulations," In IEEE Transactions on Visualization and Computer Graphics; vol. 19, Issue 9; Published Sep. 2013, http://ieeexplore.ieee.org/stamp/stamp.jsp?tp=&arnumber=6472235, pp. 1499-1512.

Eaton, et al., "Interactive Learning Using Manifold Geometry," In Proceedings of the Twenty-Fourth AAAI Conference on Artificial Intelligence, Published Jul. 11, 2010, http://www.seas.upenn.edu/~eeaton/papers/Eaton2010Interactive.pdf, 7 pages.

Frank, et al., "Visualizing Class Probability Estimators," In Proceedings of Working Paper Series ISSN 1170-487X, Published Feb. 19, 2003, http://researchcommons.waikato.ac.nz/bitstream/handle/10289/1010/uow-cs-wp-2003-02.pdf?sequence=1, 14 pages.

Rheingans, et al., "Visualizing High-Dimensional Predictive Model Quality," In Proceedings of Visualization, Published Oct. 13, 2000, http://ieeexplore.ieee.org/stamp/stamp.jsp?tp=&arnumber=885740, 5 pages.

Talbot, et al., "EnsembleMatrix: Interactive Visualization to Support Machine Learning with Multiple Classifiers," In Proceedings of SIGCHI Conference on Human Factors in Computing Systems, Published Apr. 4, 2009, CHI 2009—Visualization 2; http://dl.acm.org/citation.cfm?id=1518895, 10 pages.

Kapoor, et al., "Interactive Optimization for Steering Machine Classification," In Proceedings of SIGCHI Conference on Human Factors in Computing Systems, Published Apr. 10, 2010; CHI 2010: Machine Learning and Web Interactions; http://dl.acm.org/citation.cfm?id=1753529, pp. 1343-1352.

Hege, et al., "iPCA: An Interactive System for PCA-based Visual Analytics," In Proceedings of 11th Eurographics/IEEE—VGTC Conference on Visualization, vol. 28, Issue 3, Published Jun. 10, 2009, http://www.cs.tufts.edu/~remco/publications/2009/Eurovis-iPCA.pdf, 8 pages.

Brown, et al., "Dis-Function: Learning Distance Functions Interactively," In Proceedings of IEEE Conference on Visual Analytics Science and Technology, Published Nov. 19, 2012, http://www.cs.tuffs.edu/~remco/publications/2012/VAST2012-DisFunction.pdf, 10 pages.

Desjardins, et al., "Interactive Visual Clustering," In Proceedings of 12th International Conference on Intelligent User, Published Jan. 28, 2007, http://dl.acm.org/citation.cfm?id=1216367, pp. 361-364.

\* cited by examiner

INTERACTIVE VISUALIZATION OF MACHINE-LEARNING PERFORMANCE

BACKGROUND

Machine-learning technology is an important tool for dealing with large amounts of data. Such technology enables the construction of systems that can learn from a particular data set and, based on that learning, perform accurately on new, unseen data. Machine-learned models include classification models, such as binary classification models and multi-class classification models, entity extraction models, and ranking models. A binary classifier, for example, classifies items of data into one of two classes. To accomplish this, the classifier is provided a set of training data, where each item of training data is labeled, either automatically or manually by a human operator, as belonging to one of the two classes. The classifier learns from this labeled training data, and then, based on its learning, predicts whether new, unseen items of test data belong to one class or the other. Specifically, a probabilistic binary classifier may output a probabilistic score for each item of training and test data. The score reflects a probability, as assessed by the classifier, that the item belongs to a particular class. Thus, the score indicates confidence level associated with the classifier's prediction.

As mentioned above other machine-learned models include models that perform multi-class classification, entity extraction, and ranking. A multi-class classifier is similar to a binary classifier, but instead of classifying items of data into one of two classes, the multi-class classifier classifies items of data into one of several classes. An entity extraction model locates and classifies items of data into predefined categories, such as locating and classifying the names of people in a textual document. A ranking model assigns a score to a set of items of data for the purpose of sorting those items, such as a model used to rank search results in a web-page search engine. In order to improve and refine any of these, or other, machine-learned models, it is important that a user be able to assess how well the machine-learned model is performing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, computer storage media, and interactive graphical user interfaces (GUIs) for, among other things, displaying and interacting with performance data for a machine-learned model. In embodiments, the present invention includes a visual representation that represents the machine-learned model's performance at both a high level, across all items of data processed by the machine-learned model, and at an item level, for each item of processed data. With respect to the overall performance of the machine-learned model, embodiments of the present invention provide a visualization of whether the machine-learned model is generally making accurate predictions about the data, as a whole. The present invention further provides a visual representation of overall performance measures, including precision and recall. At the same time, the present invention provides for the visualization of item-level performance, including whether a prediction made by the machine-learned model regarding a particular item agrees with a predetermined label assigned to the item. In this way, the present invention enables a user to quickly identify, prioritize, and inspect item-specific errors made by the machine-learned model.

The visualizations of performance data provided by embodiments of the present invention are interactive in nature. For example, a user can interact with the visualization by selecting individual items of data, or viewing relationships among multiple items. The user can further interact with the visualization by providing user input, which may take the form of new data, new features, or new parameters, and visualizing the impact of the user input. Thus, in embodiments of the present invention, a user can provide input to, as well as review the performance of, a machine-learned model in a single interactive visualization.

BRIEF DESCRIPTION OF THE DRAWINGS

The present invention is described in detail below with reference to the attached drawing figures, wherein.

DETAILED DESCRIPTION

Figure 1:
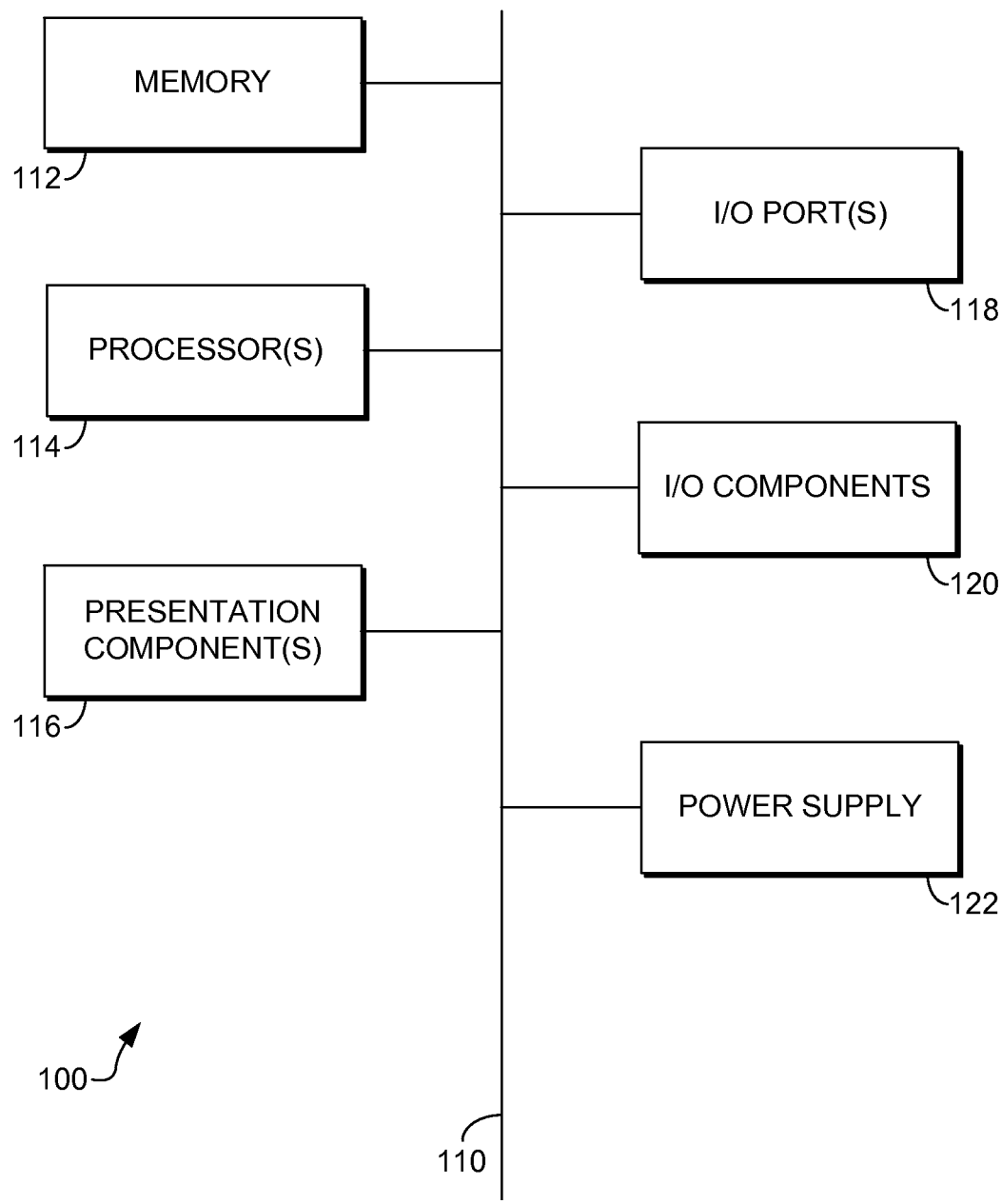
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, computer storage media, and GUIs for, among other things, providing an interactive visualization of performance data for a machine-learned model. In embodiments, the present invention includes a visual representation that simultaneously represents the machine-learned model's performance at both a high level, across all items of data processed by the machine-learned model, and an item level, for each item of processed data.

In an exemplary embodiment, the present invention provides a GUI that displays all test and training items, along with their associated labels, and arranges the items according to scores assigned by the machine-learned model. Thus, the visualization provides a sense of whether the machine-learned model is generally making accurate predictions about the data, as a whole. At the same time, the visualization depicts item-level performance, including whether a prediction made by the machine-learned model regarding a particular item agrees with the predetermined label assigned to the item. In this way, the present invention enables a user to quickly identify, prioritize, and inspect item-specific errors.

Additionally, because embodiments of the present invention provide GUIs that have consistent arrangements and orientations, a user can view the GUI and quickly identify certain patterns and understand whether the machine-learned model is performing well. In other words, in instances of the present invention, a "good" performance is visually represented in a consistent way, and similarly, certain errors are visually represented in a consistent way. Thus, the user does not need to spend time orienting himself with respect to the GUI each time performance data is displayed. This is in contrast to scatterplots and other means of visualizing performance data, which do not display the performance data for a machine-learned model in a consistent orientation.

The visualizations of performance data provided by embodiments of the present invention are interactive in nature. Thus, a user may interact with the visualization by selecting an individual item representation to view details regarding the corresponding item. The user may also select an item representation or item representations to reveal relationships among multiple items. Furthermore, additional information may be provided to the machine-learned model in order to improve its performance. Such additional information may include new data, new features, or other information. In one aspect of the invention, upon receiving additional information, an updated GUI displays updated performance data in such a way that indicates performance areas affected by the new information.

Accordingly, in one embodiment, the present invention is directed to one or more computer-readable media having computer-executable instructions embodied thereon that, when executed by a computing device, cause the computing device to generate a graphical user interface (GUI) for visualizing a performance of a machine-learned model. The GUI comprises an item representation display area that displays a plurality of item representations corresponding to a plurality of items processed by the machine-learned model. The plurality of item representations are arranged according to scores assigned to the plurality of items by the machine-learned model. Further, each of the plurality of item representations is visually configured to represent a label assigned to an item corresponding to the each of the plurality of item representations.

In another embodiment, the present invention is directed to one or more computer-readable media having computer-executable instructions embodied thereon that, when executed by a computing device, cause the computing device to perform a method for displaying performance data of a machine-learned model. The method comprises receiving a plurality of training items that have been processed by the machine-learned model and receiving a plurality of test items that have been processed by the machine-learned model. The method further includes generating a training item representation for each of the plurality of training items and generating a test item representation for each of the plurality of test items. Additionally, the method includes displaying each of the training item representations corresponding to the each of the plurality of training items and displaying each of the test item representations corresponding to the each of the plurality of test items on a graphical user interface (GUI). The GUI comprises a training item display area that displays the each of the training item representations corresponding to the each of the plurality of training items. A location of a particular training item representation is based on a score assigned to the particular training item representation's corresponding training item by the machine-learned model. The GUI further includes a test item display area that displays the each of the test item representations corresponding to the each of the plurality of test items. A location of a particular test item representation is based on a score assigned to the particular test item representation's corresponding test item by the machine-learned model.

In yet another embodiment, the present invention is directed to one or more computer-readable media having computer-executable instructions embodied thereon that, when executed by a computing device, cause the computing device to generate a graphical user interface (GUI) for visualizing a performance of a machine-learned model. The GUI comprises a training item display area that displays a plurality of training item representations, each of the plurality of training item representations representing a training item and a predetermined training item label associated with the training item. Each of the plurality of training item representations has a location that corresponds to a training item score assigned to the respective training item by the machine-learned model. The GUI further includes a test item display area that displays a plurality of test item representations, each of the plurality of test item representations representing a test item and a predetermined test item label associated with the test item. Each of the plurality of training item representations has a location that corresponds to a test item score assigned to the respective test item by the machine-learned model. Additionally, the GUI includes a configurable prediction threshold indicator usable for selecting a prediction threshold and visualizing an impact of the selected prediction threshold on the performance of the machine-learned model.

Having briefly described an overview of embodiments of the present invention, an exemplary operating environment in which embodiments of the present invention may be implemented is described below in order to provide a general context for various aspects of the present invention. Referring to the figures in general and initially to FIG. 1, in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-usable instructions, including computer-usable or computer-executable instructions such as program modules, being executed by a computer or other machine, such as a personal data assistant, a smart phone, a tablet PC, or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component, such as a display device, to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, and removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of any combination of volatile and nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like. Interaction with the I/O components 120 may be via voice, touch, gestures, keyboard, a pointing device such as a mouse, and the like.

Furthermore, although the term "server" is often used herein, it will be recognized that this term may also encompass a search service, a search extender service, a Web browser, a cloud server, a set of one or more processes distributed on one or more computers, one or more stand-alone storage devices, a set of one or more other computing or storage devices, a combination of one or more of the above, and the like.

Figure 2:
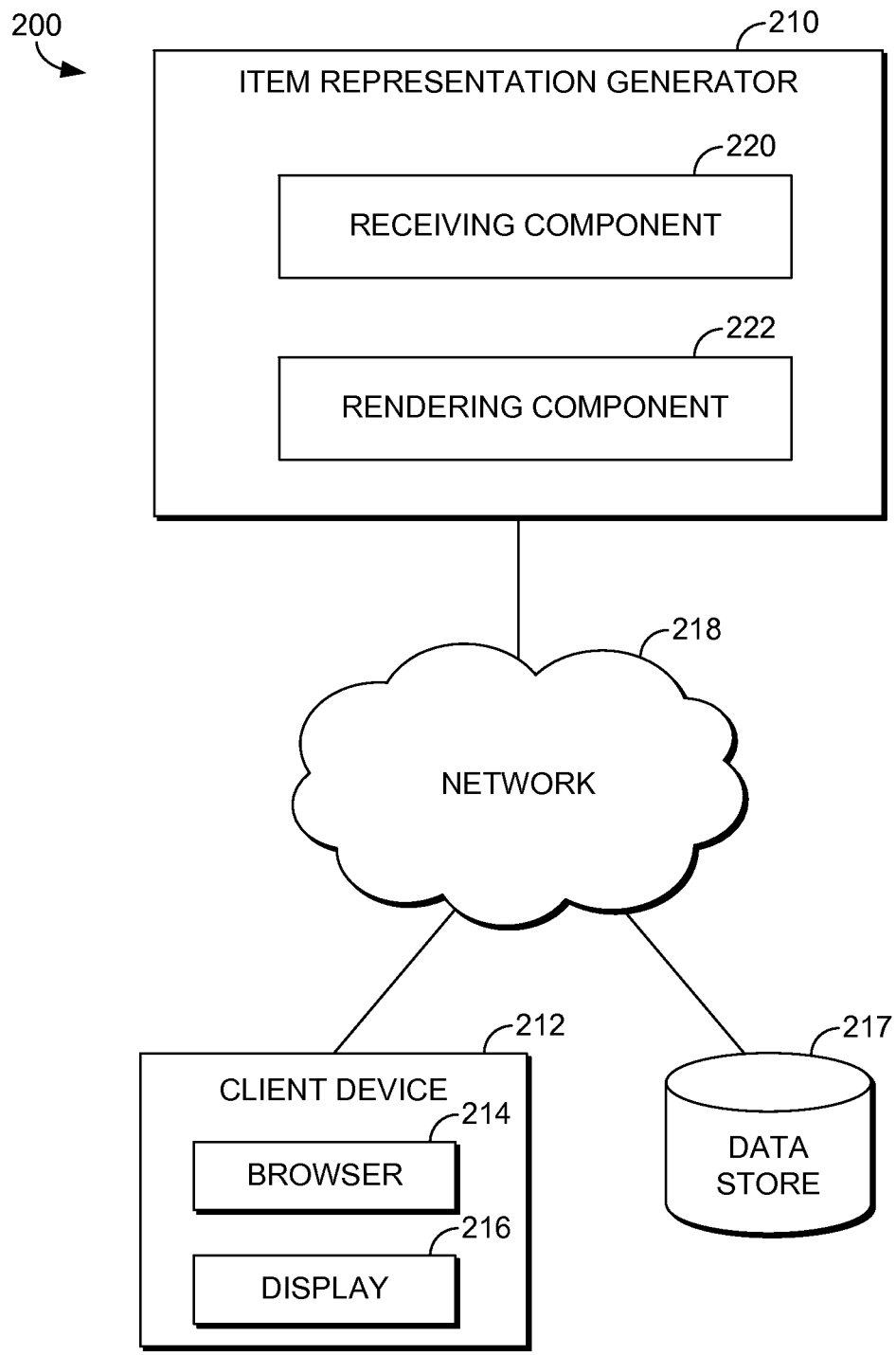
FIG. 2 is a block diagram of an exemplary system for visually representing a performance of a machine-learned model, suitable for use in implementing embodiments of the present invention.

Referring now to FIG. 2, a block diagram is provided illustrating an exemplary system 200 in which embodiments of the present invention may be employed. Generally, the system 200 illustrates an environment suitable for generating an interactive GUI that, among other things, displays performance data for a machine-learned model. In embodiments, the GUI visually represents, for each of a plurality of items processed by the machine-learned model, a predetermined label assigned to the item and a prediction made by the machine-learned model regarding the item. At the same time, the GUI provides a visual representation of the machine-learned model's performance across all items. The GUI may further provide for user interaction, such that a user can select individual items, view relationships among multiple items, and provide additional input. As mentioned, the "items" referenced herein include any item of data that is processed by a machine-learned model. An item may include, for example, text, images, video, audio, characters, words, documents, combinations of documents, web pages, or any other item of data. Furthermore, an "item" may actually include a combination of items or group of items.

Among other components and modules not shown, the system 200 generally includes an item representation generator 210, a data store 216, and a client computing device 212 with a browser 214 and a display 216, all of which are in communication with one another via a network 218. The network 218 may include, without limitation, a combination of one or more local area networks (LANs) and wide area networks (WANs). Such networking environments are commonplace in offices, enterprise-wide computer networks, intranets and the Internet. Accordingly, the network 218 is not further described herein.

Any number of item representation generators, data stores, and user computing devices may be employed in the system 200 within the scope of embodiments of the present invention. Each may comprise a single device or interface, or multiple devices and interfaces cooperating in a distributed environment. For instance, the item representation generator 210 may comprise a combination of multiple devices and modules arranged in a distributed environment that collectively provide the functionality of the item representation generator 210 described herein. Additionally, other components and modules not shown also may be included within the system 200.

In some embodiments, one or more of the illustrated components and modules may be implemented as stand-alone applications. In other embodiments, one or more of the illustrated components and modules may be implemented via the client computing device 212, as an Internet-based service, or as a module inside the item representation generator 210. It will be understood by those of ordinary skill in the art that the components and modules illustrated in FIG. 2 are exemplary in nature and in number and should not be construed as limiting. Any number of components and modules may be employed to achieve the desired functionality within the scope of embodiments hereof. Further, components and modules may be located on any number of item representation generators or user computing devices. By way of example only, the item representation generator 210 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions) can be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by any combination of hardware, firmware, and software. For instance, various functions may be carried out by a processor executing instructions stored in memory.

The client computing device 212 may include any type of computing device, such as the computing device 100 described with reference to FIG. 1, for example. Generally, the client computing device 212 includes a browser 214 and a display 216. The browser 214, among other things, is configured to render search home pages (or other online landing pages), and render results pages in association with the display 216 of the client computing device 212. The term "results page" is meant to encompass Web pages such as search engine results pages, and result pages associated with search applications, either standalone or embedded in other applications (e.g., Xbox®, Microsoft® Office, and the like). Applications such as these may present search results in association with a Web page or may present search results on other types of pages such as dialog boxes.

The browser 214 is further configured to receive user input of requests for various web pages (including search engine home pages), receive user inputted search queries (generally inputted via a user interface presented on the display 216 and permitting any combination of alpha-numeric input, textual input, voice input, and gesture input into a designated search box), and to receive content for presentation on the display 216. The browser 214 may be any suitable type of Web browser such as Internet Explorer®, Firefox®, Chrome®, Safari®, or other type of software configured to enable submission of search queries as disclosed herein. It should be noted that the functionality described herein as being performed by the browser 214 may be performed by any other application capable of rendering Web content. Any and all such variations, and any combination thereof, are contemplated to be within the scope of embodiments of the present invention. The display 216 is configured to present various content including, without limitation, browser pages, search engine home and result pages, and graphical user interfaces. In embodiments, the display 216 is further configured to enable any combination of touch inputs, auditory inputs, and gesture inputs from a user.

The item representation generator 210 may be implemented as a plug-in application, or it may be a stand-alone application on the client computing device 212. As illustrated, the item representation generator 210 includes a receiving component 220 and a rendering component 222. In some embodiments, one or more of the components 220 and 222 may be implemented as stand-alone applications. In other embodiments, one or more of the components 220 and 222 may be integrated directly into the operating system of a computing device such as the computing device 100 of FIG. 1 or the client computing device 212. It will be understood that the components 220 and 222 illustrated in FIG. 2 are exemplary in nature and in number and should not be construed as limiting. Any number of components may be employed to achieve the desired functionality within the scope of embodiments hereof.

The receiving component 220 of the item representation generator 210 is configured to receive, among other things, a plurality of items that have been processed by the machine-learned model. The receiving component 220 further receives, in embodiments, a predetermined label assigned to the items, as well as a score assigned to the items by the machine-learned model. In embodiments, the items are designated as "test" or "training" items, in which case the receiving component 220 receives this designation, as well. In some instances, the receiving component 220 receives these items, labels, scores, and test or training designations from the data store 216. The receiving component 220 is also configured to receive various user inputs. Exemplary user inputs may include the selection of a prediction threshold or the selection of an individual item or a group of items.

In embodiments, the receiving component 220 is further configured to receive updated information. In some instances, updated information is provided to the receiving component 220 in response to additional information being provided to the machine-learned model. Such additional information provided to the machine-learned model may include additional training or test items, features, or other information that is aimed to improve the performance of the machine-learned model. Upon receiving the additional information, the machine-learned model processes all items of data and in some instances, assigns new scores to the items. For some items, the new scores may differ from the scores assigned prior to receiving the additional information. Thus, the updated information received by the receiving component 220 may include new items that were not previously processed by the machine-learned model, old items that were previously processed by the machine-learned model, but that have subsequently been re-processed by the machine-learned model and assigned a new score, which may differ from the previous score, and features provided to the machine-learned model.

The rendering component 222 is configured to utilize information received by the receiving component 220 to render a GUI that displays performance data for a machine-learned model. For instance, the rendering component 222 is configured to render a plurality of item representations that correspond to the plurality of items received by the receiving component 220. Also, in embodiments, the rendering component 222 renders item representations that are visually configured to represent the predetermined labels assigned to the corresponding items. For example, the rendering component 222 might render an item representation having a certain size, shape, color, pattern, highlighting, orientation, or any other visual configuration that corresponds to an assigned label. The rendering component 222 is further configured to arrange the item representations according to the scores assigned to the corresponding items. For example, the rendering component 222 may arrange the item representations at positions oriented along a horizontal axis, such that item representations at one end of the horizontal axis correspond to items assigned a low score, and item representations at the other end of the horizontal axis correspond to items assigned a high score. A number of other arrangements are included within the scope of the present invention, such as an arrangement of item representations at positions oriented along a vertical axis, or an arrangement of item representations at positions oriented in some other way.

The rendering component 222 is additionally configured to render a prediction threshold indicator for selecting a prediction threshold. As will be explained more fully below, users can interact with the prediction threshold indicator. In additional embodiments, the rendering component 222 provides for the display of information relevant to an individual item or group of items. Such information is displayed, in embodiments, in response to a user selection of the individual item or group of items.

The rendering component 222 may also be configured to render an updated GUI having updated item representations. The updated GUI is based on updated information received at the receiving component 220. As mentioned above, the updated information received at the receiving component 220 may include old items that were previously processed by the machine-learned model, but that have subsequently been re-processed by the machine-learned model, such that the re-processed items have been assigned new scores by the machine-learned model. In embodiments, the rendering component 222 visually configures the item representations corresponding to the re-processed items to indicate that the assigned score has changed. For example, such item representations might have a different size, shape, color, pattern, highlighting, orientation, or any other visual configuration that distinguishes them from the other item representations having an unchanged score.

The illustrated item representation generator 210 also has access to a data store 216. The data store 216 is configured to store information for use by, for example, the item representation generator 210. The information stored in association with the data store 216 is configured to be searchable for information stored in association therewith. The information stored in association with the data store 216 may comprise general information used by the item representation generator 210, such as information regarding items that have been processed by the machine-learned model. Specifically, the data store 216 may store items, as well as the labels, scores, and test or training designations associated with the items. The content and volume of such information in the data store 216 are not intended to limit the scope of embodiments of the present invention in any way. Further, though illustrated as a single, independent component, the data store 216 may, in fact, be a plurality of storage devices, for instance, a database cluster, portions of which may reside on the item representation generator 210, the client computing device 212, or any combination thereof.

Figure 3:
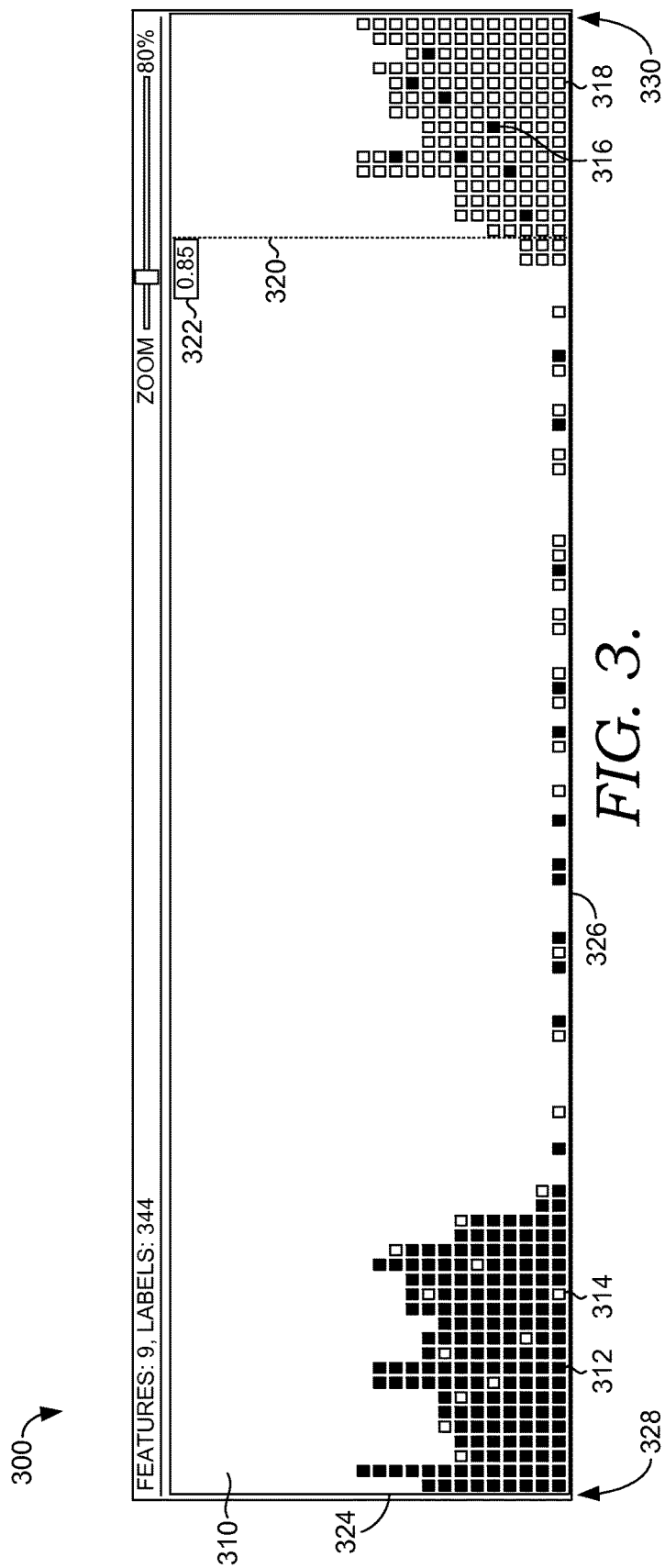
FIG. 3 is an exemplary graphical user interface for providing an interactive visualization of performance data for a machine-learned model in accordance with embodiments of the present invention.

Turning now to FIG. 3, an exemplary GUI 300 for visualizing a performance of a machine-learned model in accordance with embodiments of the present invention is illustrated. Various aspects of the GUI 300 may be rendered by a rendering component, such as rendering component 222 of FIG. 2. By way of example only, FIG. 3 is discussed below with reference to an exemplary machine-learned model that performs probabilistic binary classification, or, in other words, a machine-learned model that predicts one of two possible classes to which an item belongs, based on a probabilistic score assigned to the item. As will be further discussed herein, this example is used only to illustrate certain features of the present invention and is not intended to limit the scope of the present invention.

The GUI 300, in embodiments, provides for the visualization of performance data for a machine-learned model that is configured to determine whether a particular item of data belongs to one of two classes. As an example, the machine-learned model may determine whether an item of data includes an image of a numerical digit. In this example, the machine-learned model classifies items of data into one of two classes: (1) positive, which indicates the item is a numerical digit, and (2) negative, which indicates the item is not a numerical digit. The performance data displayed in the GUI 300 provides a visualization of how well the machine-learned model is performing this classification, as compared to the items' labels, which are considered to indicate the true classes to which the items belong.

The GUI 300 includes an item representation display area 310. The item representation display area 310 displays a plurality of item representations, including exemplary item representations 312, 314, 316, and 318. As shown in the GUI 300, the item representations are depicted as square tiles, but any shape or graphical representation may be used. The item representations may represent all of the items processed by the machine-learned model. In other aspects, the item representations may represent a subset of the items processed by the machine-learned model. Any and all such variations, and any combination thereof, are contemplated as being within the scope of the invention.

Each of the item representations in the GUI 300 represents an item that has been processed by the machine-learned model. Each such item is associated with a predetermined label that is related to a class to which the item belongs. For example, an item including an image of the number "1" may be assigned a label indicating that the item belongs to a class comprising numerical digits. Similarly, an item including an image of the letter "A" may, for example, be assigned a label indicating that the item belongs to a class comprising alphabetic characters. For purposes of the binary classification example being discussed herein, the image of the number "1" is assigned a "positive" label, indicating that the item is a numerical digit, while the image of the letter "A" is assigned a "negative" label, indicating that the item is not a numerical digit.

In embodiments, an item representation is visually configured to represent the label assigned to the particular item represented by the particular item representation. The visual configuration may include, in embodiments, a size, shape, color, pattern, highlighting, orientation, or any other visual configuration of the item representation. In the GUI 300, the item representations are visually configured to have either a white or black color, where white corresponds to a positive label and black corresponds to a negative label. These colors are exemplary only, and other colors are contemplated as being within the scope of the invention. For instance, green may represent a positive label and red may represent a negative label. In the GUI 300, item representations 314 and 318 are visually configured to have a white color, and may represent items that are, for example, associated with a positive label, or in other words, items that have been labeled as comprising numerical digits. On the other hand, item representations 312 and 316 are visually configured to have a black color, and may represent items that are, for example, associated with a negative label, or in other words, items that have been labeled as not comprising numerical digits. In this exemplary embodiment, a user viewing the GUI 300 can easily identify item representations 314 and 318 as representing items having a positive label, and can also easily identify item representations 312 and 316 as representing items having a negative label.

Each of the items represented by the item representations in FIG. 3 is assigned a score by the machine-learned model. The machine-learned model assigns a score to an item that reflects the probability, as assessed by the machine-learned model, that the item belongs to the positive class, i.e., the class including numerical digits. Such probability may be expressed on a scale of 0 to 1, for instance. Other scoring ranges are included within the scope of the present invention. Scores at the high and low ends of the scoring range reflect a high level of confidence by the machine-learned model, while scores in the mid-range reflect uncertainty. If the machine-learned model is performing well, then it will assign a high score to items that have positive labels, as this indicates that the machine-learned model has correctly determined it is very likely that the items include, for instance, an image of a numerical digit. Similarly, if the machine-learned model is performing well, then it will assign a low score to items that have negative labels, as this indicates that the machine-learned model has correctly determined it is very unlikely that the items include, for example, an image of a numerical digit.

In embodiments, the item representations are arranged according to the scores assigned by the machine-learned model. The item representations in the GUI 300, for example, are located at positions oriented along a horizontal axis 326 at the bottom of the item representation display area 310. In embodiments, the item representations are arranged in order of ascending score, with item representations that represent items assigned a low score being located at the left end of the horizontal axis 326, and item representations that represent items assigned a high score being located at the right end of the horizontal axis 326. In the GUI 300, position 328 corresponds to the lowest score and position 330 corresponds to the highest score, such as 0 and 1, respectively, for example. So, for instance, item representation 312 represents an item having an assigned score of approximately 0.10, while item representation 316 represents an item having an assigned score of approximately 0.90. In the present binary classification example, these scores indicate that the item represented by item representation 312 has a probability of approximately 10% of belonging to the positive class, while the item represented by item representation 316 has a probability of approximately 90% of belonging to the positive class. The scope of the present invention is not limited to the arrangement of item representations along the horizontal axis 326 as depicted in the GUI 300. Rather, a wide variety of arrangements and configurations are included within the scope of the present invention, such as, for example, an arrangement of item representations along a vertical axis 324 or along an axis oriented in some other direction. Furthermore, such an axis may depict any range of scores and may be scaled in any number of ways, including both linear and non-linear scaling. Any arrangement in which a location of an item representation is based on a score assigned to the corresponding item is contemplated as being within the scope of the invention.

The machine-learned model makes a prediction about each item based on its assigned score and a prediction threshold 322 (in this case, the prediction threshold 322 is set at 0.85). In the exemplary embodiment illustrated in the GUI 300, if the score assigned to an item satisfies the prediction threshold 322, then the machine-learned model predicts that the item belongs to the positive class; conversely, if the score assigned to an item does not satisfy the prediction threshold 322, then the machine-learned model predicts that the item belongs to the negative class. In one aspect of the invention, the prediction threshold 322 may be defined by a user. For example, the user may interact with the prediction threshold indicator 320 to set a particular value for the prediction threshold 322. In the GUI 300, the user may drag the prediction threshold indicator 320 to the right to increase the prediction threshold 322, or the user may drag the prediction threshold indicator 320 to the left to decrease the prediction threshold 322. In other embodiments, where the item representations are arranged along the vertical axis 324, for example, the user may drag the prediction threshold indicator 320 up or down to increase or decrease, respectively, the prediction threshold 322.

In the GUI 300, the prediction threshold indicator 320 indicates that the prediction threshold 322 has been set at 0.85. In other words, the prediction threshold indicator 320 visually indicates that if the machine-learned model determines that an item has at least an 85% probability of belonging to the positive class, then the machine-learned model predicts that the item belongs to the positive class. Otherwise, the machine-learned model predicts that the item belongs to the negative class.

In the GUI 300, the score assigned to the item represented by the item representation 318 satisfies the prediction threshold 322, as indicated by the location of the item representation 318 to the right of prediction threshold indicator 320. This visually represents the machine-learned model's prediction that the corresponding item belongs to the positive class. This prediction matches the item's label, as indicated by the white color of item representation 318, and item representation 318 is thus said to represent a "true positive." The score assigned to the item represented by the item representation 312 does not satisfy the prediction threshold 322, as indicated by the location of the item representation 312 to the left of the prediction threshold indicator 320. This visually represents the machine-learned model's prediction that the item belongs to the negative class. This prediction matches the item's label, as indicated by the black color of item representation 312, and item representation 312 is thus said to represent a "true negative." In this way, the GUI 300 enables a user to easily visualize both the label associated with an item and the machine-learned model's prediction for that item, as the item representations located to the right of the prediction threshold indicator 320 represent items associated with a positive prediction, while the item representations located to the left represent items associated with a negative prediction.

As illustrated by the GUI 300, and as explained in greater detail below, the present invention provides a visual representation of the machine-learned model's performance at both a high level, across all items of data processed by the machine-learned model, and at an item level, for each item of processed data. With reference to the GUI 300, if the machine-learned model is performing well overall, then the black item representations will be concentrated at the left side of the item representation display area 310, while the white item representations will be concentrated at the right side. Such an arrangement indicates that the machine-learned model is performing well, because the items labeled as positive have correctly been assigned high probabilities of belonging to the positive class, while items labeled as negative have correctly been assigned low probabilities of belonging to the positive class.

A divergence in the item representations further indicates that the machine-learned model is performing well. A divergence in the item representations occurs when the majority of the item representations are located at either end of the item representation display area 310 and very few item representations are located in the middle portion of the item representation display area 310. This arrangement is indicative of a machine-learned model that is performing well, because it visually represents the fact that the machine-learned model is assigning either low or high probabilities to all of the items. A high or low probability indicates confidence that a particular item either does or does not, respectively, belong to the positive class. Conversely, when the majority of item representations are located in the middle portion of the item representation display area 310, this visually represents the fact that the machine-learned model is assigning mid-range probabilities to the majority of items. A mid-range probability indicates a determination by the machine-learned model that the likelihood of a particular item belonging to the negative class is roughly the same as the likelihood of that same item belonging to the positive class. Thus, such a score corresponds to a lack of confidence on the part of the machine-learned model, which is undesirable from a performance perspective. In this way, a user viewing the GUI 300 may quickly and easily gain a sense of the overall performance of the machine-learned model.

Certain performance measures, including precision and recall, which relate to the overall performance of the machine-learned model, are also visually represented in the GUI 300. In the context of classification, precision is a measure of the number of items that are correctly predicted as belonging to a particular class, as compared to the total number of items that are predicted as belonging to a particular class. Thus, in the GUI 300, precision is visually represented by the number of white item representations that are located to the right of the prediction threshold indicator 320, as compared to the total number of all item representations (both white and black) located to the right of the prediction threshold indicator 320. In the context of classification, recall is a measure of the number of items that are correctly predicted as belonging to a particular class, as compared to the total number of items that actually belong to that particular class. Thus, in the GUI 300, recall is visually represented by the number of white item representations that are located to the right of the prediction threshold indicator 320, as compared to the total number of all white item representations included in the item representation display area 310.

Embodiments of the present invention further provide a visualization of the effect that adjusting the prediction threshold 322 has on various performance measures, including precision and recall. For example, in some instances, if the prediction threshold 322 is increased, such as by adjusting the prediction threshold indicator 320 to the right, the measure of precision increases (this is true when a greater portion of the item representations to the right of the prediction threshold indicator 320 is white). In other instances, when the prediction threshold 322 is increased, such as by adjusting the prediction threshold indicator 320 to the right, the measure of precision decreases (this is true when a smaller portion of the item representations to the right of the prediction threshold indicator 320 is white). If the prediction threshold 322 is decreased, such as by adjusting the prediction threshold indicator 320 to the left, recall increases in some instances (this is true when a greater portion of the total number of white item representations is located to the right of the prediction threshold indicator 320). Conversely, in other instances, when the prediction threshold 322 is decreased, such as by adjusting the prediction threshold indicator 320 to the left, recall may remain unchanged (this is true when the portion of the total number of white item representations located to the right of the prediction threshold indicator 320 remains unchanged). Thus, a visualization of the tradeoff between precision and recall is provided, thereby aiding the user in conceptualizing these performance measures. This tradeoff is important in understanding the performance of the machine-learned model, but, absent the present invention, can be difficult for users to conceptualize and visualize. The above discussion of visual representations of precision and recall is but one example of the many types of performance measures that can be visualized using the GUI 300.

At the same time that the GUI 300 provides a visualization of the overall performance of the machine-learned model, as described above, the GUI 300 also provides a visualization of the machine-learned model's performance at the item level. A user viewing the GUI 300 can easily see, for each item processed by the machine-learned model, whether the score assigned to the item by the machine-learned model agrees with the item's label. For example, a user can easily see whether a white item representation is located at the right side of the item representation display area 310, near position 330, which would indicate that the assigned score agrees with the item's label.

Errors involving a disagreement between an item's label and a score assigned to the item by the machine-learned model may be easily recognized, as indicated by white item representations on the left side of the item representation display area 310, such as item representation 314, and black item representations on the right side of the item representation display area 310, such as item representation 316. More specifically, the item represented by item representation 314 has a positive label, as indicated by the white color, but the machine-learned model has assigned the item a low score, meaning the machine-learned model incorrectly determined it is unlikely that the item belongs to the positive class. Furthermore, the item representation 314 is located to the left of the prediction threshold indicator 320, which indicates the machine-learned model incorrectly predicts that the corresponding item belongs to the negative class. Thus, the item representation 314 represents a "false negative" error.

The item represented by item representation 316 has a negative label, as indicated by the black color, but the machine-learned model has assigned the item a high score, meaning the machine-learned model incorrectly determined it is likely that the item belongs to the positive class. Furthermore, the item representation 316 is located to the right of the prediction threshold indicator 320, which indicates the machine-learned model incorrectly predicts that the corresponding item belongs to the positive class. Thus, the item representation 316 represents a "false positive" error. In this way, the present invention provides a visual representation of specific types of errors. This allows a user to quickly identify and resolve such errors.

The present invention may further enable a user to prioritize errors that are more egregious than others. For example, the resolution of errors may be prioritized based on the locations of the item representations corresponding to the errors. If an item representation corresponding to an error is located at one of the far ends of the item representation display area 310, near either position 328 or position 330, that error may be considered an egregious error. This is because the machine-learned model has assigned very high or very low scores to the items represented by the item representations located at the far ends of the item representation display area 310, and this indicates a high level of confidence regarding these items. It is more concerning when the machine-learned model is very confident in an erroneous prediction than it is when the machine-learned model makes such an error with some degree of uncertainty.

Item representation 316, for example, represents a false positive error, as explained above, and item representation 316 is located at the far right side of the item representation display area 310. Based on the location of item representation 316, a user may determine that the error is particularly concerning, because the machine-learned model has assigned a very high probability to the item represented by item representation 316, incorrectly indicating confidence that the item belongs to the positive class. This may be more problematic than an item labeled as negative that is assigned a mid-range score, such as a score of 0.50, because such a score indicates uncertainty by the machine-learned model. In this way, the present invention enables a user to easily prioritize the more egregious errors over the less concerning errors, simply by viewing the GUI 300.

As previously mentioned, the GUI 300 is interactive in nature. One aspect of this interactive nature is the ability of a user, in embodiments, to select an individual item representation, such as an item representation that appears to be associated with an error, and obtain details regarding the corresponding item. The display of such details may be rendered by a rendering component, such as the rendering component 222 of FIG. 2. These details may appear in a pop-up box within the item representation display area 310, in a separate display area, or in any number of other display configurations. Regardless of the display configuration, the item details enable the user to examine the item, investigate the cause of the error, and remedy the error. In some instances, the user may discover that an item is associated with an incorrect label. For example, a user may select the item representation 314 and determine that, although the corresponding item has been assigned a positive label, the item actually does not include an image of a numerical digit, and the item should therefore have a negative label. In such an instance, the user can correct the item label and thereby resolve the error. The user's correction of the error may be received by a receiving component, such as the receiving component 220 of FIG. 2. Following such correction, item representation 314 may be changed to have a black color, instead of a white color, and that particular false negative would be resolved. The present invention enables all of this activity, which includes both collecting and reviewing data, to be accomplished in a single GUI.

The example discussed above with respect to FIG. 3 involves an exemplary embodiment of the present invention for providing an interactive visualization of performance data for a machine-learned model that classifies items as positive (i.e., a numerical digit) or negative (i.e., not a numerical digit). This example is not intended to be limiting, however, as the present invention may provide interactive visualizations of performance data for numerous machine-learned models, including any machine-learned model having a predictive output that can be projected onto a single dimension to reflect a degree of confidence in the prediction. Such machine-learned models include, for instance, binary classification models, multi-class classification models, entity extraction models, and ranking models.

A multi-class classification model classifies items into one of several classes. For example, suppose that instead of classifying items as "a numerical digit" or "not a numerical digit," the classifier classifies items as a specific numerical digit. For example, the classifier may classify items as "1," "2," "3," or "4." This multi-class classification may be reduced to a series of binary classifications, and the performance data may thus be illustrated as discussed above with respect to FIG. 3. For example, a first class display area may illustrate performance data for the classification of items as "1" or "not 1." In this example, the location of item representations within the item representation display area 310 would indicate a probability or confidence, as assessed by the classifier, that the item includes an image of a "1." A second class display area may illustrate performance data for the classification of items as "2" or "not 2." Similarly, a third and fourth class display area may illustrate performance data for the classification of items as "3" or "not 3" and "4" or "not 4," respectively. Thus, the GUI 300 in some embodiments includes a plurality of class display areas, with each of the plurality of class display areas having, for example, a training item display area, a test item display area, and a configurable prediction threshold indicator.

The invention may further provide, for a multi-class classifier, a visualization of the classifier's relative confidence in predicting other subsets of possible outcomes. For example, the present invention may provide a visual representation of the classifier's confidence that an item is either a "1" or a "4." In this example, the two possible classes might include "1 or 4" or "neither 1 nor 4." Additionally, the classifier's confidence in this prediction could be compared to its confidence in an alternative prediction. For example, the two classes might include "1 or 4" or "3." In this latter example, the arrangement of item representations in the item representation display area 310 would reflect the classifier's confidence that an item is either a 1 or a 4, as compared to its confidence that an item is a 3.

As mentioned, embodiments of the invention also provides a visual representation of the performance data for entity extraction models. An entity extraction model examines a document and identifies items included therein that have a particular property. For example, an entity extraction model might be used to extract sequences of tokens in text documents that correspond to "addresses," and categorize the sequence of tokens as such. The entity extraction model might further extract sub-sequences, such as "city," "street," and "zip code," that are included within the address and categorize the sub-sequences accordingly. A visual representation provided by the present invention for such a model may thus indicate, for instance, whether the entity extraction model is extracting the relevant tokens, and further, whether the model is correctly labeling such tokens. In this example, the item representations included in the item representation display area 310 may correspond to certain tokens, sequences of tokens, characters, words, strings of words, entire documents, or any other entity to be extracted and labeled. The visual configuration of the item representations, including a size, shape, color, pattern, highlighting, orientation, or any other visual configuration of the item representations, may correspond to a label assigned to the item. The location of the item representations may indicate a confidence that the entity extraction model has in assigning a label to the item. For example, an item representation may have a green color to indicate an "address" label, and the item representation may be located at the far right of the display area to indicate confidence on the part of the entity extractor model that the item belongs to the "address" category. Other possibilities for the configuration and arrangement of item representations and item representation display areas include at least all of those discussed above with respect to the classifiers.

The invention may further provide a visualization of performance data for a ranking model. A ranking model typically assigns a rank score to a set of items for the purpose of sorting those items, such as a model used to rank search results in a web-page search engine. Thus, the item representations in the present invention may correspond to a plurality of items, such as web pages, for example, that are to be ranked by the ranking model. A label indicating a desired rank may be assigned to each item, either automatically or manually by a human operator. The label assigned to each item may be represented by a visual configuration of the corresponding item representations, including a size, shape, color, pattern, highlighting, orientation, or any other visual configuration of the item representations. Suppose, for example, that a color of an item representation corresponds to an assigned label indicating a desired rank. The item representations in the item representation display area 310 may then be arranged according to the rank score assigned to the items by the ranking model. If the machine-learned model is performing well, then, for example, item representations will be clustered along the horizontal axis 326 according to color.

Figure 4:
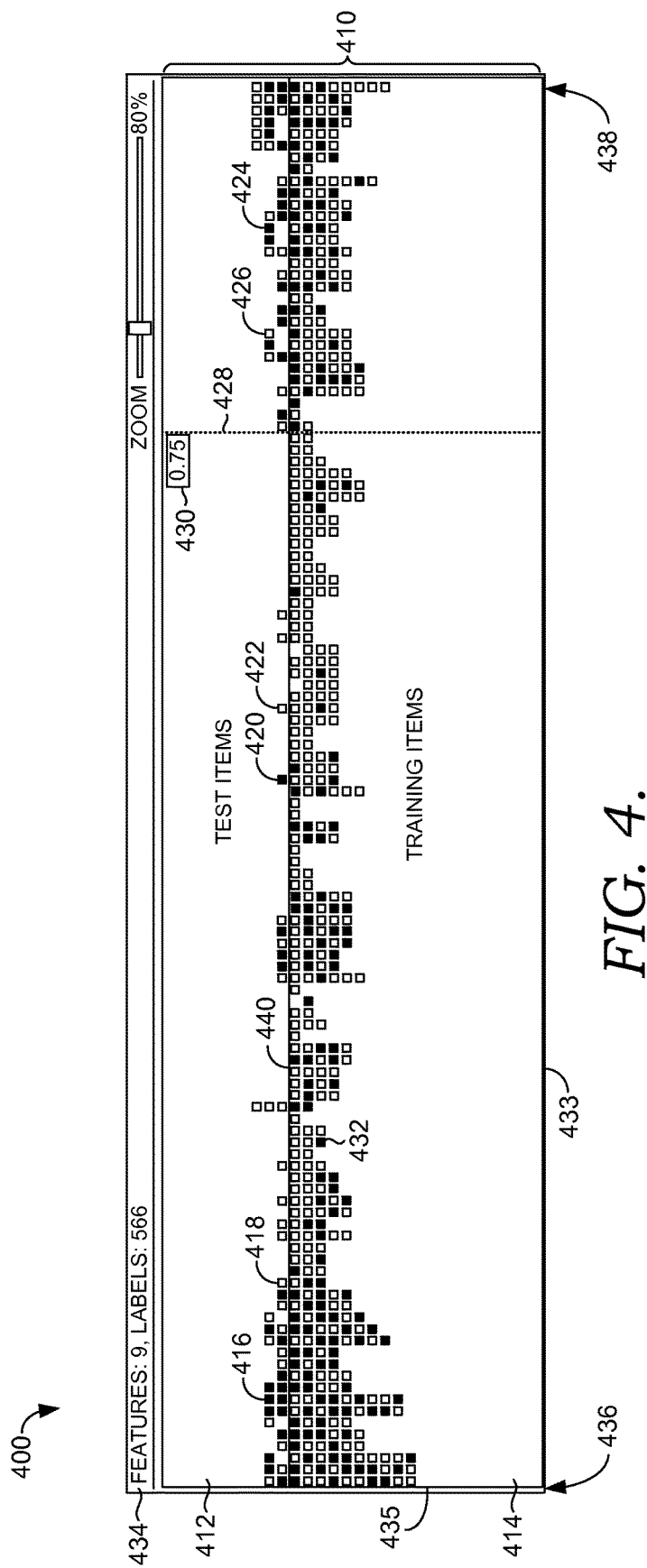
FIG. 4 is an exemplary graphical user interface for providing an interactive visualization of performance data for a machine-learned model, wherein an item representation display area is divided into a test item display area and a training item display area, in accordance with embodiments of the present invention.

Turning now to FIG. 4, an exemplary GUI 400 is illustrated in accordance with embodiments of the present invention. The GUI 400 includes many of the features depicted in the GUI 300 of FIG. 3, including an item representation display area 410, a prediction threshold 430, a prediction threshold indicator 428, a horizontal axis 433, a vertical axis 435, a position 436 corresponding to a lowest score, and a position 438 corresponding to a highest score. A detailed discussion of these common features is not repeated with respect to the GUI 400. Also, as explained with respect to the GUI 300 of FIG. 3, various features of the GUI 400 may be rendered by a rendering component, such as the rendering component 222 of FIG. 2.

The GUI 400 includes an item representation display area 410 that is divided into two display areas, including a test item display area 412 and a training item display area 414. Division may occur by, for example, demarcating the areas 412 and 414 by a visual marker, such as the line 440. In the GUI 400, the test item display area 412 and training item display area 414 are vertically adjacent to one another, but any other arrangement of these two display areas is within the scope of the present invention. The two display areas may be, for example, horizontally adjacent to one another. Alternatively, the display areas may not be adjacent to one another at all, but may instead be two separate windows. Other arrangements also fall within the scope of the present invention.

The training item display area 414 displays a plurality of training item representations, including training item representation 432, that represent items used to train the machine-learned model. In the example of a machine-learned model that performs classification, the training items and their corresponding labels are provided to the machine-learned model as examples of the types of items that belong to a particular class. The machine-learned model learns from the labeled training items, and then, based on its learning, classifies a set of items, including new, unseen test items, as belonging to one of several classes. The test item display area 412 displays a plurality of test items representations, including test item representations 416, 418, 420, 422, 424, and 426, that represent the new, unseen test items. The performance of the machine-learned model is evaluated based on its classification of both training and test items. The GUI 400 thus provides a visualization of an additional dimension of data, as the GUI 400 provides a comparison of the performance for training items, which were previously provided, along with their corresponding labels, to the machine-learned model for training purposes, and the performance for test items, which are new to the machine-learned model.

This juxtaposition of test and training item representations provides at least several benefits. Separating the test item representations from the training item representations provides a visualization of the machine-learned model's ability to generalize its learning based on the training items, such that it can successfully apply that learning to test items. If the machine-learned model performs very well for the training data, but very poorly for the test data, that is problematic from a performance perspective. In some instances, this may be an indication that the machine-learned model is over-trained. Based on this information, any necessary corrections may be made.

Generally, errors in the test items may be more problematic than errors in the training items, and the separate visualization of each set of items can thus be useful in debugging the machine-learned model. In one aspect of the invention, attention may be called to the test item display area 412 by fading the training item display area 414, or imparting some other visual configuration that highlights the test item display area 412.

The GUI 400 also includes a header 434 that provides some information regarding the displayed item representations and the corresponding items. In the exemplary embodiment depicted in FIG. 4, the header 434 indicates that 9 features are provided to the machine-learned model. In embodiments, a user may select a link in the header 434 to view and edit a list of the features. Such a list of features may appear as a pop-up box, an additional panel in the GUI 400, a separate display window, or any other visual configuration. The header 434 further includes an indication of "Labels: 566." This may refer to the total number of labeled items represented by the plurality of item representations.

Figure 5:
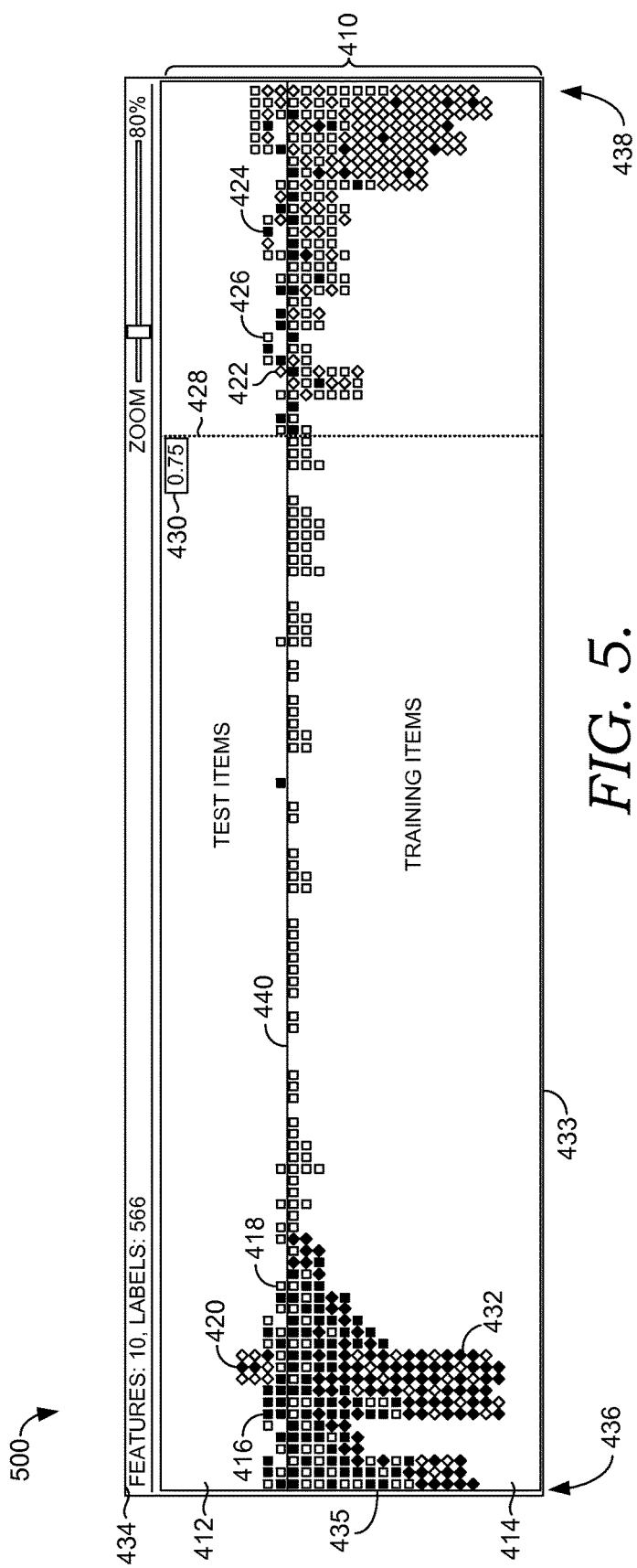
FIG. 5 is an exemplary graphical user interface for providing an interactive visualization of performance data for a machine-learned model, wherein modified test item representations and modified training item representations visually represent the effect that providing additional information to the machine-learned model has on individual test items and training items, in accordance with embodiments of the present invention.

Turning now to both FIG. 4 and FIG. 5, wherein like numbering represents like elements, these figures illustrate the interactive nature of the present invention. The GUI 400 of FIG. 4 and the GUI 500 of FIG. 5 include performance data for the same machine-learned model processing the same set of training and test items. The GUI 400 presents a visual representation of performance data before the machine-learned model receives additional information, while the GUI 500 presents a visual representation of performance data after the machine-learned model receives such additional information. Additional information is provided to the machine-learned model to enhance its performance. This additional information may be provided via user input at the GUIs of the present invention. The additional information may include any combination of additional training items, additional test items, features, and other information relevant to the performance of the machine-learned model.

The GUI 400 indicates that the machine-learned model is performing relatively poorly. There are at least several indications of its poor performance. First, the item representations are generally dispersed along the horizontal axis 433, as opposed to being concentrated at one end or the other, near either position 436 or position 438. This spread indicates that the machine-learned model has assigned a wide range of scores to the item representations, and that the performance of the machine-learned model might be improved by providing additional information. Such additional information might increase the confidence levels associated with the predictions made by the machine-learned model, which would be visually represented by a divergence in the item representations, such that the majority of item representations are located at the opposite ends of the horizontal axis 433, near either position 436 or position 438.

A second indication of poor performance is the large number of false positives and false negatives displayed in the GUI 400. As previously explained, the false positives are represented by the black item representations located to the right of the prediction threshold indicator 428, including test item representation 424. The false negatives are represented by the white item representations located to the left of the prediction threshold indicator 428, including test item representations 418 and 422. These errors might be resolved by providing additional information to the machine-learned model.

As mentioned, in order to improve performance, additional information is provided to the machine-learned model. For example, a combination of additional training items and additional test items may be provided to the machine-learned model. Furthermore, a user may provide additional features to be used by the machine-learned model in assigning scores to the items and making predictions about the items. This additional feature is reflected in the header 434 of the GUI 500, which shows that 10 features have been provided to the machine-learned model, as compared to the header 434 of the GUI 400, which shows that only 9 features have been provided to the machine-learned model. A feature may pertain to a property of an item or items, or some other piece of information that assists the machine-learned model in making predictions. For example, a user may provide a feature to a machine-learned model that instructs the machine-learned model that closed circles are indicative of numerical digits. The machine-learned model may then rely on this feature when it determines a probability that an item includes an image comprising a numerical digit. While such additional information is provided by a user in some instances, additional information may also be automatically provided or automatically retrieved in other embodiments.

After additional information is provided to the machine-learned model, the GUI 400 is automatically updated, as reflected in the GUI 500. The GUI 500 displays the same item representations included in GUI 400, but the arrangement of such item representations has been updated to reflect the assignment of updated scores based on the additional information provided. In embodiments, when the additional information provided to the machine-learned model includes new training items or new test items, the GUI 500 may also include new item representations that correspond to any new training items and new test items that have been provided.

In the GUI 500, the item representations corresponding to items having updated scores that are different from previous scores are modified to visually indicate the changed score. The test item represented by test item representation 422, for example, was assigned a score of approximately 0.60 prior to the additional information being provided, as illustrated in the GUI 400. Subsequent to providing the additional information, this test item was assigned an updated score of approximately 0.80. The test item representation 422 is thus modified in the GUI 500 to visually indicate a change in the score assigned to the corresponding test item. Specifically, the test item representation 422 is rotated 45 degrees such that the test item representation 422 resembles a diamond, rather than a square. Other visual modifications are within the scope of the present invention, including, for example, a modified size, shape, color, pattern, highlighting, orientation, or any other modification of the item representation. In embodiments, an item representation is modified only if the change in the score assigned to the corresponding item is a significant change. In embodiments, a significant change may include a change that exceeds a specified magnitude, a change that results in a changed prediction about the item (i.e., the previous score was below the prediction threshold 430 and the updated score is above the prediction threshold 430), or any other change that is deemed significant. This provides a visualization of an effect that a particular piece of updated information has on the performance of the machine-learned model.

In embodiments, a replay feature is provided, such that a user may toggle between GUI 400, GUI 500, and any other updated GUI displaying performance data for the machine-learned model. In this way, the user may play back the performance data for the machine-learned model and review the effects that specific pieces of additional information have had on the performance of the machine-learned model. Additionally, a bookmark feature may allow a user to bookmark a particular item representation corresponding to a particular item in order to track that particular item over time. This bookmarking feature may, for example, allow a user to select an item representation and bookmark it, where such bookmark changes the size, shape, color, pattern, orientation, or any other visual aspect of the item representations. In this way, a user could easily track the particular item over time.

In further embodiments, a filtering feature is provided, which enables as user to filter according to data that is desired to be visualized. For example, the filtering feature may enable a user to filter the items such that only item representations that represent items having updated scores that are different from previous scores are displayed. Thus, for example, only item representations having a diamond shape might be displayed, where such diamond configuration is used to indicate a change associated with a corresponding item, while item representations having a square shape are not.

Figure 6:
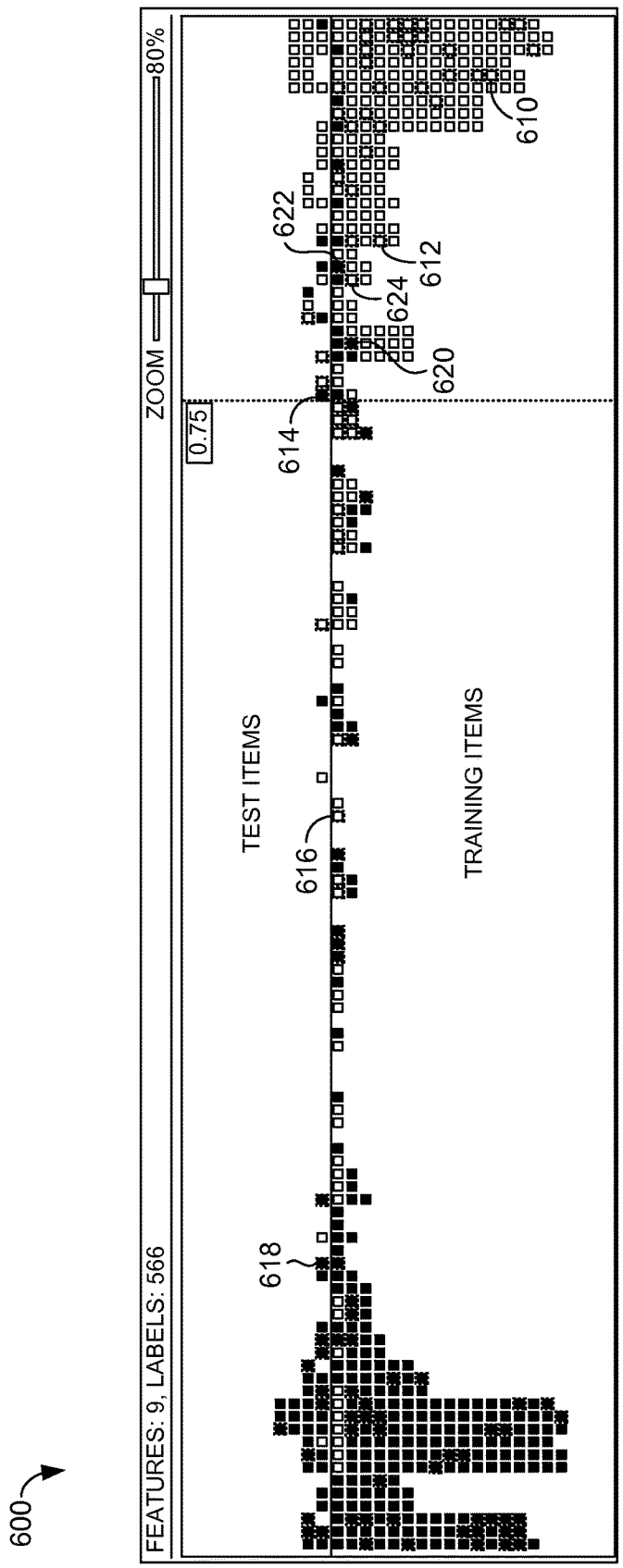
FIG. 6 is an exemplary graphical user interface for providing an interactive visualization of performance data for a machine-learned model, wherein the highlighting of item representations indicates a relationship among the corresponding items, in accordance with embodiments of the present invention.

Turning now to FIG. 6, an exemplary GUI 600 for visualizing a performance of a machine-learned model in accordance with embodiments of the present invention is illustrated. The GUI 600 illustrates the way in which additional information may be overlaid on the item representations. In one aspect of the invention, a subset of the plurality of item representations is visually configured to indicate a relationship among the items corresponding to the subset of item representations. In embodiments, the visual configuration includes highlighting the subset of item representations. Highlighting the subset of item representations may include, for example, outlining the item representations, creating a halo around the items, animating the item representations, such as causing them to blink, rotate, or move, and changing the size, shape, color, pattern, orientation, or any other visual aspect of the item representations. The relationship among the corresponding items may include, for instance, a common attribute shared by the items, such as a common feature or property, as discussed in more detail below.

In the GUI 600, item representations 610, 612, 614, 616, 618, 620, 622, and 624, among other item representations, are highlighted. In one aspect of the invention, this indicates a relationship among the corresponding items. For example, each of the items represented by item representations 610, 612, 614, 616, 618, 620, 622, and 624, as well as the other highlighted item representations, may include the feature of closed circles, which has been provided to the machine-learned model as a feature that indicates a numerical digit. In embodiments, these items are highlighted in response to a user selection of one of the items sharing the common feature, or in response to a user selection of the shared feature. In further embodiments, the relationship among the highlighted items may be some other attribute or property shared by the items.

The relationship represented by the highlighted item representations may also be a nearest-neighbor relationship. The nearest-neighbors of a selected item are the closest, or the most similar, items to the selected item. The nearest-neighbors may substantially match the selected item, and may, for example, share a high degree of similarity, such as a 90% similarity. For example, if a selected item includes an image of a 3, the nearest neighbor of that selected item might be an image of an 8. With reference to the GUI 600, a user might, for example, select or hover over item representation 614, which indicates a false positive error, in order to debug the error. In response to this selection, item representations 620, 622, and 624 are highlighted to indicate that the items corresponding to these item representations are the nearest neighbors of the selected item corresponding to the selected item representation 614. The user may then examine these nearest neighbors in an effort to debug the error associated with item representation 614.

Many other relationships and types of information may be overlaid on the item representations. For example, a center of gravity indication may be overlaid on the item representation display area. Additionally, embodiments of the present invention highlight, or otherwise visually configure, only those item representations corresponding to items having an assigned score that is changed by the addition of a particular feature. The overlaying of other information is included within the scope of this invention.

Figure 7:
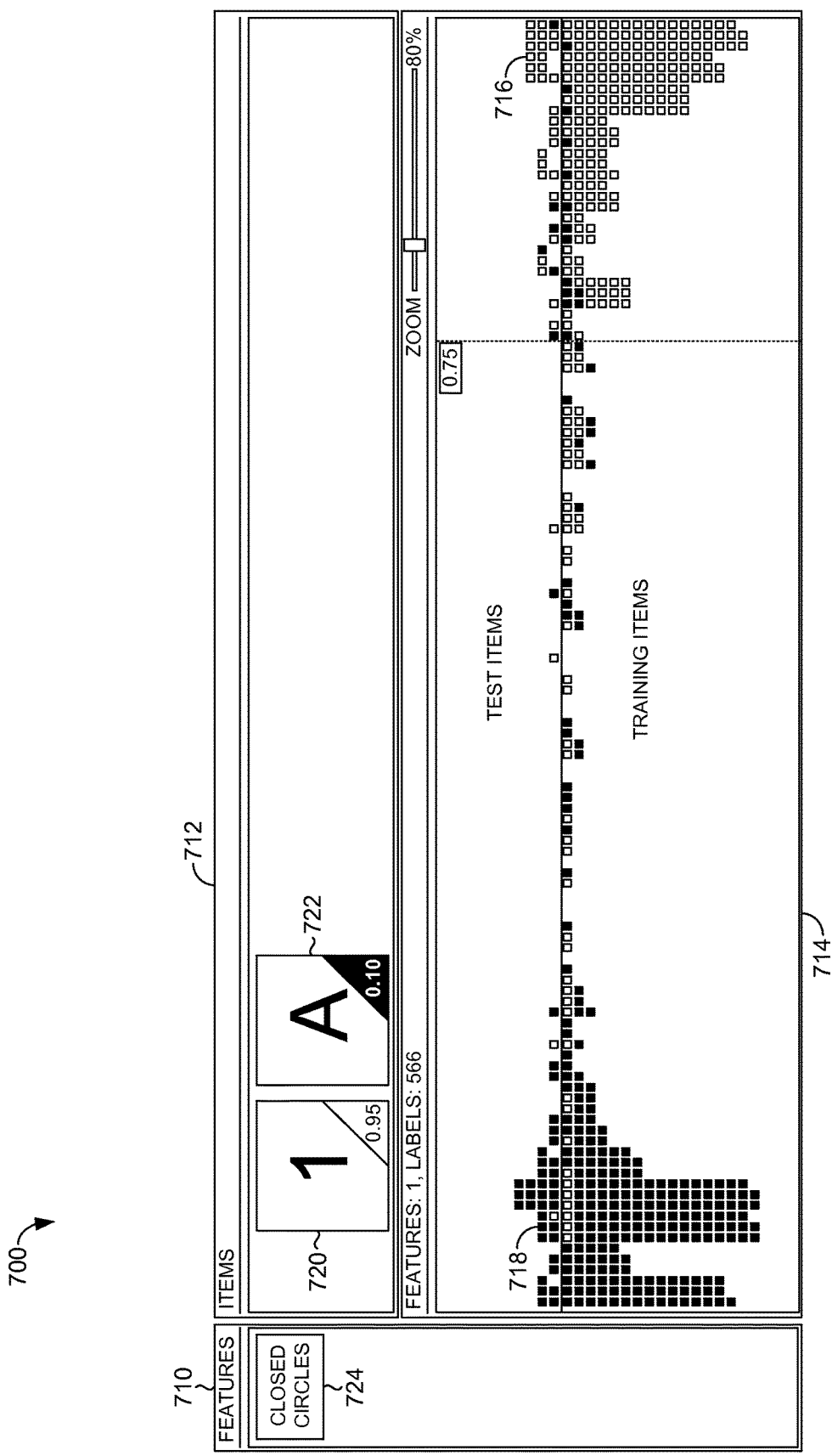
FIG. 7 is an exemplary graphical user interface for providing an interactive visualization of performance data for a machine-learned model, wherein the graphical user interface includes an item representation display area, an item panel, and a feature panel, in accordance with embodiments of the present invention.

Turning now to FIG. 7, FIG. 7 includes an exemplary GUI 700 for providing an interactive visualization of performance data for a machine-learned model. The item representation display area 714 includes features that have been previously discussed, including a test item display area, training item display area, and prediction threshold indicator. A discussion of these and other features that were previously discussed is not repeated here. The GUI 700 further includes a feature panel 710 and an item panel 712. The feature panel 710 displays features that have been provided to the machine-learned model, including feature 724. Features may be added, edited, or deleted via user input at the feature panel 710. Furthermore, in embodiments, a selection of a feature in the feature panel 710 causes item representations that correspond to an item including that feature to be highlighted.

In embodiments, the item panel 712 is an item display area that displays information associated with at least one of the plurality of items that has been processed by the machine-learned model and that is represented by one of the plurality of item representations in the item representation display area 714. Item 720, for example, is represented by item representation 716. In the item panel 712, item 720 is marked by a triangular label in the lower right-hand corner. The white color of the label indicates that the item 720 has been assigned a positive label. The number "0.95" included in the label indicates that the machine-learned model has assigned a score of 0.95 to the item 720. Similarly, item 722 is represented by item representation 718. The item 722 is marked by a triangular label in the lower right-hand corner. The black color of the label indicates that the item 722 has been assigned a negative label. The number "0.10" indicates that the machine-learned model has assigned a score of 0.10 to the item 722. In this way, details regarding a specific item are provided in the item panel 712. This is useful for, among other things, inspecting and resolving errors. The examples shown in the GUI 700 are exemplary only. Other ways of depicting the information associated with the items 720 and 722 are contemplated as being within the scope of the invention.

In further embodiments, new items that have not yet been processed by the machine-learned model are displayed in the item panel 712. In embodiments, new items are labeled by providing input at the item panel 712. Furthermore, in embodiments, new items in the item panel 712 are selected to be provided to the machine-learned model.

Figure 8:
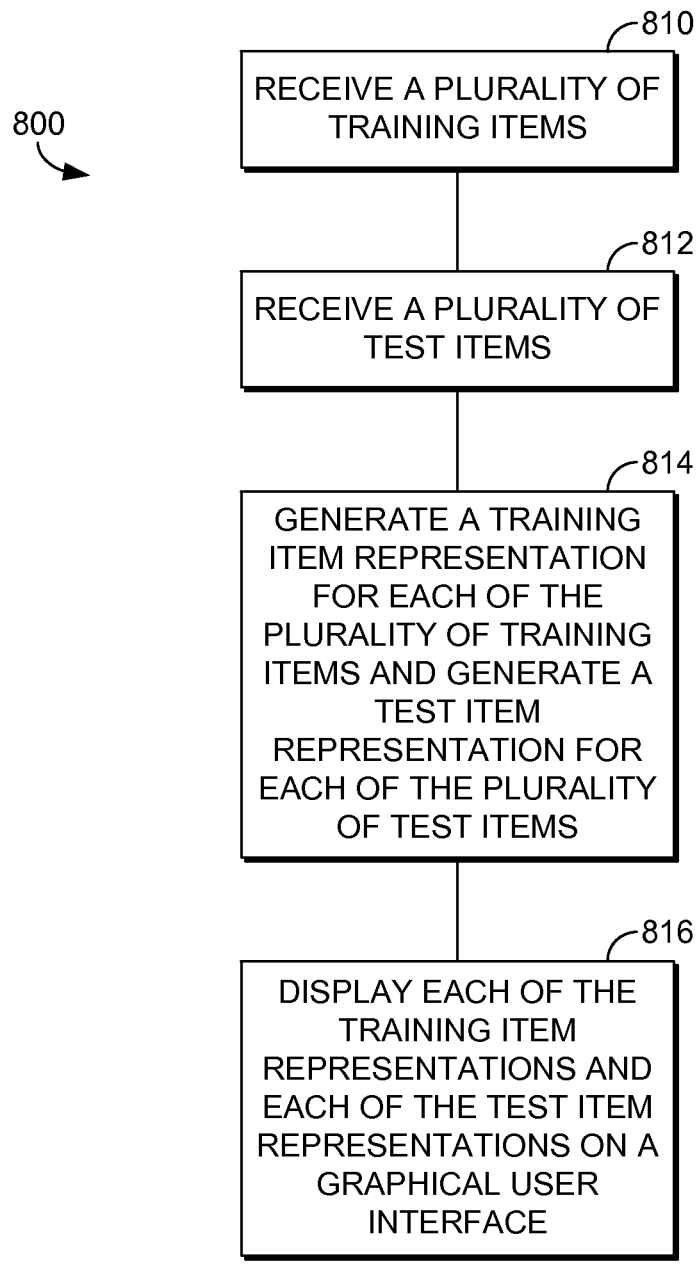
FIG. 8 is a flow diagram that illustrates an exemplary method of displaying performance data of a machine-learned model in accordance with an embodiment of the present invention.

Turning now to FIG. 8, a flow diagram of an exemplary method 800 of displaying performance data for a machine-learned model is illustrated. At a step 810, a plurality of training items is received, and at step 812, a plurality of test items is received. These items may be received by a receiving component, such as the receiving component 220 of FIG. 2. At step 814, a training item representation is generated for each of the plurality of training items and a test item representation is generated for each of the plurality of test items. These training item representations and test item representations may be rendered by a rendering component, such as the rendering component 222 of FIG. 2. At step 816, each of the training item representations and each of the test items representations are displayed on a GUI. In embodiments, the GUI includes a training item display area that displays each of the training item representations. A location of a particular training item representation is based on a score assigned by the machine-learned model to the training item corresponding to the particular training item representation. The GUI further includes, in embodiments, a test item display area that displays each of the test item representations. A location of a particular test item representation is based on a score assigned by the machine-learned model to the test item corresponding to the particular test item representation. A visual configuration of a particular training item representation is based, for instance, on a label assigned to the particular training item representation's corresponding training item. Similarly, a visual configuration of a particular test item representation may be based on a label assigned to the particular test item representation's corresponding test item.

Additionally, the GUI may include a prediction threshold indicator for selecting a prediction threshold. The prediction threshold indicator may visually separate a first subset of the plurality of item representations from a second subset of the plurality of item representations. The first subset of the plurality of item representations corresponds to a first subset of the plurality of items that the machine-learned model has associated with a first class, while the second subset of the plurality of item representations corresponds to a second subset of the plurality of items that the machine-learned model has associated with a second class.

The method 800 further includes, in embodiments, receiving updated information that has been processed by the machine-learned model. The updated information may be received by a receiving component, such as the receiving component 220 of FIG. 2. The updated information may comprise additional training items, additional test items, additional features, or any combination thereof. Updated scores, which are based on the updated information, for the plurality of training items and the plurality of test items are also received. The method 800 may further include, based on the updated scores, updating the display of the training item representations and the test item representations on the GUI. Updating the display includes, for instance, modifying at least one of the test item representations that corresponds to a test item having an updated score that is different from the score assigned to the test item prior to receiving the updated information.

Additionally, the method 800 includes, in embodiments, receiving a selection of at least one of a test item representation and training item representation. In response the received selection, information may be displayed on the GUI. The displayed information may be associated with the selected at least one of the test item representation and training item representation. For example, the displayed information may include a selected item corresponding to the selected at least one of the test item representation and training item representation, the selected item's label, and the selected item's assigned score. Features associated with the selected item may also be displayed.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer storage media having computer-executable instructions embodied thereon that, when executed by a computing device, cause the computing device to perform a method for displaying performance data of a machine-learned model, the method comprising:
   receiving a plurality of training items that have been processed by the machine-learned model;
   receiving a plurality of test items that have been processed by the machine-learned model;
   generating a plurality of training item representations for the plurality of training items, wherein one training item representation corresponds to one training item, and wherein each individual training item representation is visually configured based on a label assigned to a training item corresponding to the individual training item representation, the label indicating whether the corresponding training item belongs to a class;
   generating a plurality of test item representations for the plurality of test items, wherein one test item representation corresponds to one test item, and wherein each individual test item representation is visually configured based on a label assigned to a test item corresponding to the individual test item representation, the label indicating whether the corresponding test item belongs to the class;
   providing for display, in an item representation display area, a training item display area that displays the plurality of training item representations, wherein a location of each individual training item representation in a first direction is based on a score assigned to the training item corresponding to the individual training item representation, the score corresponding to a probability, determined by the machine-learned model, that the corresponding training item belongs to the class, and wherein a location of each individual training item representation in a second direction is based on a count of training items associated with one of a plurality of score ranges; and
   providing for display, in the item representation display area, a test item display area that is visually separated from the training item display area and that displays the plurality of test item representations, wherein a location of each individual test item representation in the first direction is based on a score assigned to the test item corresponding to the individual test item representation, the score corresponding to a probability, determined by the machine-learned model, that the corresponding test item belongs to the class, and wherein a location of each individual test item representation in the second direction is based on a count of test items associated with one of the plurality of score ranges.

2. The media of claim 1, further comprising:
   receiving updated information that has been processed by the machine-learned model;
   receiving updated scores for the plurality of training items and the plurality of test items, the updated scores based on the updated information; and
   based on the updated scores, updating the display of the plurality of training item representations and the plurality of test item representations.

3. The media of claim 2, wherein the updated information comprises additional training items or test items.

4. The media of claim 2, wherein the updated information comprises an input of a feature.

5. The media of claim 2, wherein updating the display comprises modifying a visual configuration of at least one test item representation or training item representation, the at least one test item representation or training item representation corresponding to a test item or a training item, respectively, having an updated score that is different from the score assigned prior to receiving the updated information, wherein the visual configuration comprises an orientation of the at least one test item representation or training item representation.

6. The media of claim 2, further comprising:
   receiving a selection of a selected test item representation or training item representation; and
   in response to the received selection, displaying information associated with the selected test item representation or training item representation.

7. The media of claim 6, wherein the displayed information comprises a selected item corresponding to the selected test item representation or training item representation, the selected item's label, and the selected item's assigned score.

8. A computer system comprising:
one or more processors; and
one or more computer storage media storing computer-executable instructions that, when executed by the one or more processors, are configured to implement a method comprising:
receiving a plurality of training items that have been processed by a machine-learned model;
receiving a plurality of test items that have been processed by the machine-learned model;
generating a plurality of training item representations for the plurality of training items, wherein each of the plurality of training item representations visually represents one training item of the plurality of training items, and wherein each individual training item representation is visually configured based on a label assigned to a training item corresponding to the individual training item representation, the label indicating whether the corresponding training item belongs to one of one or more classes;
generating a plurality of test item representations for the plurality of test items, wherein each of the plurality of test item representations visually represents one test item of the plurality of test items, and wherein each individual test item representation is visually configured based on a label assigned to a test item corresponding to the individual training item representation, the label indicating whether the corresponding test item belongs to one of the one or more classes;
providing for display, in an item representation display area, a training item display area comprising the plurality of training item representations, wherein a location of each individual training item representation in a first direction is based on a score assigned to the training item corresponding to the individual training item representation, the score corresponding to a probability, determined by the machine-learned model, that the corresponding training item belongs to one of the one or more classes, and wherein a location of each individual training item representation in a second direction is based on a count of training items associated with one of a plurality of score ranges; and
providing for display, in the item representation display area, a test item display are comprising the plurality of test item representations, wherein a location of each individual test item representation in the first direction is based on a score assigned to the test item corresponding to the individual test item representation, the score corresponding to a probability, determined by the machine-learned model, that the corresponding test item belongs to one of the one or more classes, and wherein a location of each individual test item representation in the second direction is based on a count of test items associated with one of the plurality of score ranges.

9. The computer system of claim 8, wherein a score assigned to a particular test item is updated by the machine-learned model and, based on the updated score, a location of a particular test item representation corresponding to the particular test item is changed and a visual configuration of the particular test item representation is modified, the visual configuration comprising at least one of a size, a shape, a color, a pattern, a highlighting, or an orientation of the particular test item representation.

10. The computer system of claim 8, wherein the method implemented further comprises providing for display a performance display area that displays a precision value and a recall value associated with a selected prediction threshold.

11. The computer system of claim 8, wherein the machine-learned model is at least one of a binary classification model, a multi-class classification model, an entity extraction model, or a ranking model, and wherein the method further comprises providing for display a plurality of class display areas.

12. A computer-implemented method comprising:
receiving a plurality of training items that have been processed by a machine-learned model;
receiving a plurality of test items that have been processed by the machine-learned model;
generating a plurality of training item representations for the plurality of training items, wherein one training item representation corresponds to one training item, and wherein each individual training item representation is visually configured based on a label assigned to a training item corresponding to the individual training item representation, the label indicating whether the corresponding training item belongs to a class;
generating a plurality of test item representations for the plurality of test items, wherein one test item representation corresponds to one test item, and wherein each individual test item representation is visually configured based on a label assigned to a test item corresponding to the individual test item representation, the label indicating whether the corresponding test item belongs to the class;
providing for display, in an item representation display area, a training item display area that displays the plurality of training item representations, wherein a location of each individual training item representation along a first axis is based on a score assigned to the training item corresponding to the individual training item representation, the score corresponding to a probability, determined by the machine-learned model, that the corresponding training item belongs to the class, and wherein a location of each training item representation along a second axis is based on a count of training items to which one of a plurality of score ranges has been assigned by the machine-learned model; and
providing for display, in the item representation display area, a test item display area that displays the plurality of test item representations, wherein a location of each individual test item representation along the first axis is based on a score assigned to the test item corresponding to the individual test item representation, the score corresponding to a probability, determined by the machine-learned model, that the corresponding test item belongs to the class, and wherein a location of each test item representation along the second axis is based on a count of test items to which one of the plurality of score ranges has been assigned by the machine-learned model.

13. The computer-implemented method of claim 12, wherein each individual training item representation being visually configured based on the label assigned to the corresponding training item comprises each individual training item representation having a color indicating the label assigned to the corresponding training item.

14. The computer-implemented method of claim 12, wherein the first axis comprises a horizontal axis defining a scoring scale corresponding to probabilities determined by the machine-learned model and the second axis comprises a vertical axis defining a count of training items and test items to which one of the plurality of score ranges has been assigned by the machine-learned model.

15. The computer-implemented method of claim 12, further comprising providing for display a prediction threshold indicator usable for selecting a prediction threshold.

16. The computer-implemented method of claim 15, wherein the prediction threshold indicator visually separates a first subset of the plurality of training item representations from a second subset of the plurality of training item representation, and further visually separates a first subset of the plurality of test item representations from a second subset of the plurality of test item representations, the first subset of the plurality of training item representations and the first subset of the plurality of test item representations corresponding to a first subset of the plurality of training items and a first subset of the plurality of test items, respectively, that the machine-learned model has associated with a first class, and the second subset of the plurality of training item representations and the second subset of the plurality of test item representations corresponding to a second subset of the plurality of training items and a second subset of the plurality of test items, respectively, that the machine-learned model has associated with a second class.

17. The computer-implemented method of claim 12, further comprising providing for display information associated with at least one of the plurality of training items or the plurality of test items.

18. The computer-implemented method of claim 12, wherein a subset of the plurality of test item representations is further visually configured to indicate a relationship among a subset of the plurality of test items corresponding to the subset of the plurality of test item representations.

19. The computer-implemented method of claim 18, wherein the relationship comprises a common attribute shared by the subset of the plurality of test items, wherein the subset includes fewer than all of the plurality of test items, and wherein the method further comprises highlighting the subset of the plurality of test item representations that corresponds to the subset of the plurality of test items that share the common attribute.

20. The computer-implemented method of claim 12, further comprising highlighting a subset of the plurality of test item representations that correspond to a subset of the plurality of test items that satisfy a predetermined similarity threshold with respect to a selected test item.

\* \* \* \* \*